United States Patent
Yokoyama et al.

(10) Patent No.: US 10,696,237 B2
(45) Date of Patent: Jun. 30, 2020

(54) ATTACHMENT COMPONENT

(71) Applicant: Honda Access Corp., Niiza-shi, Saitama (JP)

(72) Inventors: Shoji Yokoyama, Niiza (JP); Kazuya Takita, Niiza (JP)

(73) Assignee: HONDA ACCESS CORP., Niiza-shi (JP)

( * ) Notice: Subject to any disclaimer, the term of this patent is extended or adjusted under 35 U.S.C. 154(b) by 125 days.

(21) Appl. No.: 15/719,780

(22) Filed: Sep. 29, 2017

(65) Prior Publication Data
US 2018/0093618 A1    Apr. 5, 2018

(30) Foreign Application Priority Data
Oct. 4, 2016    (JP) .................... 2016-196140

(51) Int. Cl.
*F16M 11/00* (2006.01)
*B60R 11/00* (2006.01)
(Continued)

(52) U.S. Cl.
CPC ............ *B60R 11/00* (2013.01); *B60R 19/483* (2013.01); *G01S 7/521* (2013.01);
(Continued)

(58) Field of Classification Search
CPC .................. B60R 11/00; B60R 21/013; B60R 2011/0042
See application file for complete search history.

(56) References Cited

U.S. PATENT DOCUMENTS 5,124,957 A * 6/1992 Owens .................... G04G 15/00
368/107
5,716,154 A * 2/1998 Miller ..................... B60R 11/00
403/22
(Continued)

FOREIGN PATENT DOCUMENTS

JP    56-044898 Y2    10/1981
JP    60-004291 U    1/1985
(Continued)

OTHER PUBLICATIONS

Office Action dated Jul. 16, 2019, issued in counterpart JP Application No. 2016-196140, with English translation (4 pages).

*Primary Examiner* — Amy J. Sterling
(74) *Attorney, Agent, or Firm* — Westerman, Hattori, Daniels & Adrian, LLP (57) ABSTRACT

Provided is a highly versatile attachment component corresponding to a space around an attachment location of a vehicular member. A retainer for attaching an ultrasonic sensor to a vehicle has a member holding portion for holding the ultrasonic sensor; and an attachment portion that is to be attached to the vehicle. The attachment portion has a center attachment part; a plurality of attachment pieces which are an upper attachment piece, a lower attachment piece, a left attachment piece and a right attachment piece; and cuttable sections joining the center attachment part and the multiple attachment pieces. These attachment pieces can be removed by cutting the cuttable sections. Therefore, some of the attachment pieces may be removed so as to secure a space around a location to which the ultrasonic sensor is to be attached, thus allowing the ultrasonic sensor to be attached to the vehicle.

10 Claims, 6 Drawing Sheets

(51) Int. Cl.
*B60R 19/48* (2006.01)
*G01S 7/521* (2006.01)
*G01S 15/931* (2020.01)

(52) U.S. Cl.
CPC . *B60R 2011/004* (2013.01); *B60R 2011/0063* (2013.01); *G01S 15/931* (2013.01); *G01S 2015/938* (2013.01)

(56) References Cited

U.S. PATENT DOCUMENTS

| | | | | |
|---|---|---|---|---|
| 6,398,252 | B1* | 6/2002 | Ishikawa | B60R 16/0239 |
| | | | | 280/727 |
| 7,373,809 | B2* | 5/2008 | Shattuck | B01D 35/143 |
| | | | | 73/114.79 |
| 2009/0001759 | A1* | 1/2009 | Kondo | B60R 19/483 |
| | | | | 296/187.03 |
| 2009/0054784 | A1* | 2/2009 | Okuda | G01S 7/521 |
| | | | | 600/459 |
| 2015/0307047 | A1* | 10/2015 | Davis | B60R 21/013 |
| | | | | 293/117 |

FOREIGN PATENT DOCUMENTS

| | | |
|---|---|---|
| JP | 4056568 B2 | 3/2008 |
| JP | 2010-071956 A | 4/2010 |
| JP | 2016-13812 A | 1/2016 |

\* cited by examiner

ATTACHMENT COMPONENT

TECHNICAL FIELD

The present invention relates to an attachment component for attaching a vehicular member to a vehicle.

BACKGROUND ART

There has been used an ultrasonic sensing system for informing a vehicle driver of the approach of an obstacle such that when a vehicle driven by a driver is approaching an obstacle in his/her surroundings while the vehicle is traveling, an ultrasonic sensor attached to a bumper or the like of the vehicle senses the approach of the obstacle, and then issues a warning alarm such as a buzzer sound to the driver. As a retainer for attaching such ultrasonic sensor that constitutes this system to a vehicular bumper or the like, there is known, for example, a retainer disclosed in Japanese un-examined patent application publication No. 2016-013812 (hereinafter patent document 1). The retainer includes a retainer main body through which a sensor main body of the ultrasonic sensor is inserted, and attaching portions for attaching the retainer to the bumper. Each of the attaching portions is connected to the retainer main body via a connection portion and a base portion, having, as a whole, a substantially rectangular shape in a plan view.

Also, there is disclosed in Japanese patent publication No. 4056568 (hereinafter patent document 2), another retainer (or retaining part) which is tube-shaped in order for an ultrasonic sensor to be inserted thereinto. This retainer has an end face as a front part thereof such that the end face and a bumper are fixed to each other by adhesion or the like.

SUMMARY OF THE INVENTION

Problems to be Solved by the Invention

Conventionally, ultrasonic sensors have often been attached to the inside of a vehicular bumper. The interior space of a bumper, however, is sometimes spatially restricted, due to an engine compartment often installed in proximity thereto, a radiator or a vehicular body reinforcing member sometimes arranged therein, a fog lamp attached to the bumper, and the configuration of the bumper itself.

In a case of performing a post-installation of an ultrasonic sensor on such vehicle, if the retainer having the attaching portions of a substantially rectangular shape in a plan view as disclosed in Patent Document 1 is used, there is a problem that a part of the attaching portion is abutted against the above-mentioned radiator, reinforcing member, fog lamp, etc., thus severely restricting the installing positions of the ultrasonic sensor, or making it impossible to install a proximity sensor at the worst.

According to the retainer of Patent Document 2, the end face to be fixed to a bumper is formed so small that the installing position of an ultrasonic sensor will be less restricted. Nevertheless, there has been concern that due to such small end face, the fixing strength of the retainer against the bumper becomes low, resulting in the possible detachment of the retainer from the bumper.

In order to solve such problems, it is an object of the present invention to provide an attachment component which is less subject to restrictions on the attaching position of a vehicular member due to its surrounding parts, and has an enhanced versatility.

Means to Solve the Problems

[1]
An attachment component for attaching a vehicular member to a vehicle, comprising:
a member holding portion for holding the vehicular member; and
an attachment portion to be attached to the vehicle,
wherein said attachment portion includes a center attachment part, a plurality of attachment pieces, and cuttable sections joining said center attachment part and the plurality of said attachment pieces, and
wherein said attachment pieces can be removed by cutting said cuttable sections.

[2]
The attachment component according to [1], wherein said center attachment part is formed into a rectangular shape, and said attachment pieces are provided on four sides of said center attachment part.

[3]
The attachment component according to [1], wherein each of said attachment pieces is formed into a shape of a flat plate.

[4]
The attachment component according to [2], wherein each of said attachment pieces is formed into a shape of a flat plate.

[5]
The attachment component according to [1], wherein said cuttable sections are thin-walled linear grooves that are thinner than said attachment pieces.

[6]
The attachment component according to [2], wherein said cuttable sections are thin-walled linear grooves that are thinner than said attachment pieces.

[7]
The attachment component according to [3], wherein said cuttable sections are thin-walled linear grooves that are thinner than said attachment pieces.

[8]
The attachment component according to [4], wherein said cuttable sections are thin-walled linear grooves that are thinner than said attachment pieces.

[9]
The attachment component according to [1], wherein each of said attachment pieces is formed into a shape of a triangle tapering away from said center attachment part.

[10]
The attachment component according to [2], wherein each of said attachment pieces is formed into a shape of a triangle tapering away from said center attachment part.

[11]
The attachment component according to [3], wherein each of said attachment pieces is formed into a shape of a triangle tapering away from said center attachment part.

[12]
The attachment component according to [4], wherein each of said attachment pieces is formed into a shape of a triangle tapering away from said center attachment part.

[13]
The attachment component according to [5], wherein each of said attachment pieces is formed into a shape of a triangle tapering away from said center attachment part.

[14]
The attachment component according to [6], wherein each of said attachment pieces is formed into a shape of a triangle tapering away from said center attachment part.

[15]
The attachment component according to [7], wherein each of said attachment pieces is formed into a shape of a triangle tapering away from said center attachment part.

[16]
The attachment component according to [8], wherein each of said attachment pieces is formed into a shape of a triangle tapering away from said center attachment part.

[17]
The attachment component according to [1], wherein said vehicular member is an ultrasonic sensor.

[18]
The attachment component according to [2], wherein said vehicular member is an ultrasonic sensor.

[19]
The attachment component according to [3], wherein said vehicular member is an ultrasonic sensor.

[20]
The attachment component according to [5], wherein said vehicular member is an ultrasonic sensor.

Effects of the Invention

According to the invention described in [1], the attachment part to be used can be arbitrarily selected by removing a part of the attachment part.

According to the invention described in [2], the attachment part can be provided at an interval of 90° around the central part in a well-balanced manner.

According to the inventions described in [3] and [4], the attachment part can be removed easily.

According to the inventions described in [5] to [8], the cuttable sections can be easily formed.

MODE FOR CARRYING OUT THE INVENTION

Embodiments of the present invention are described hereunder with reference to the accompanying FIG. 1 to FIG. 6.

The embodiments described below shall not limit the contents of the inventions described in the claims. Further, not all the elements described below shall necessarily constitute the critical elements of the present invention.

First Embodiment

Figure 1:
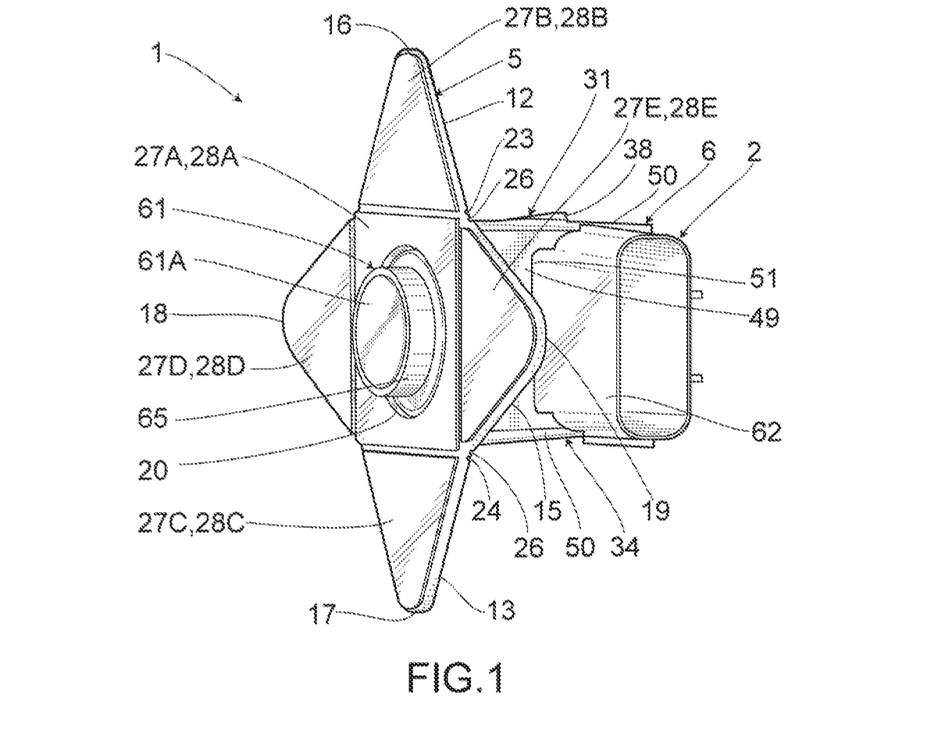
FIG. 1 is a perspective view showing an attachment component of a first embodiment of the invention, in which a vehicular member has already been installed in such attachment component.
Figure 2:
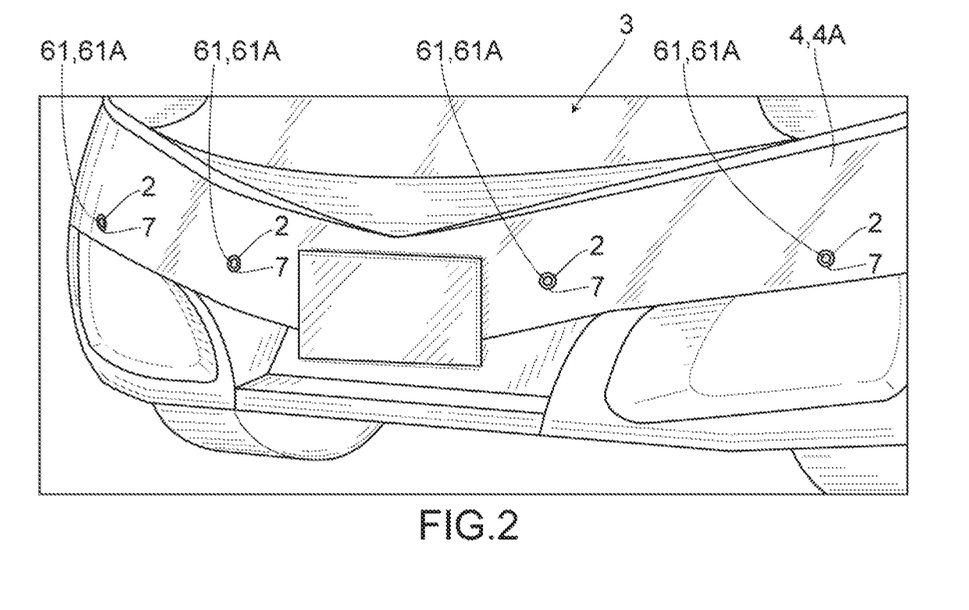
FIG. 2 is an enlarged view showing a main part of a vehicle to which the vehicular member has been attached in the first embodiment of the invention.
Figure 3:
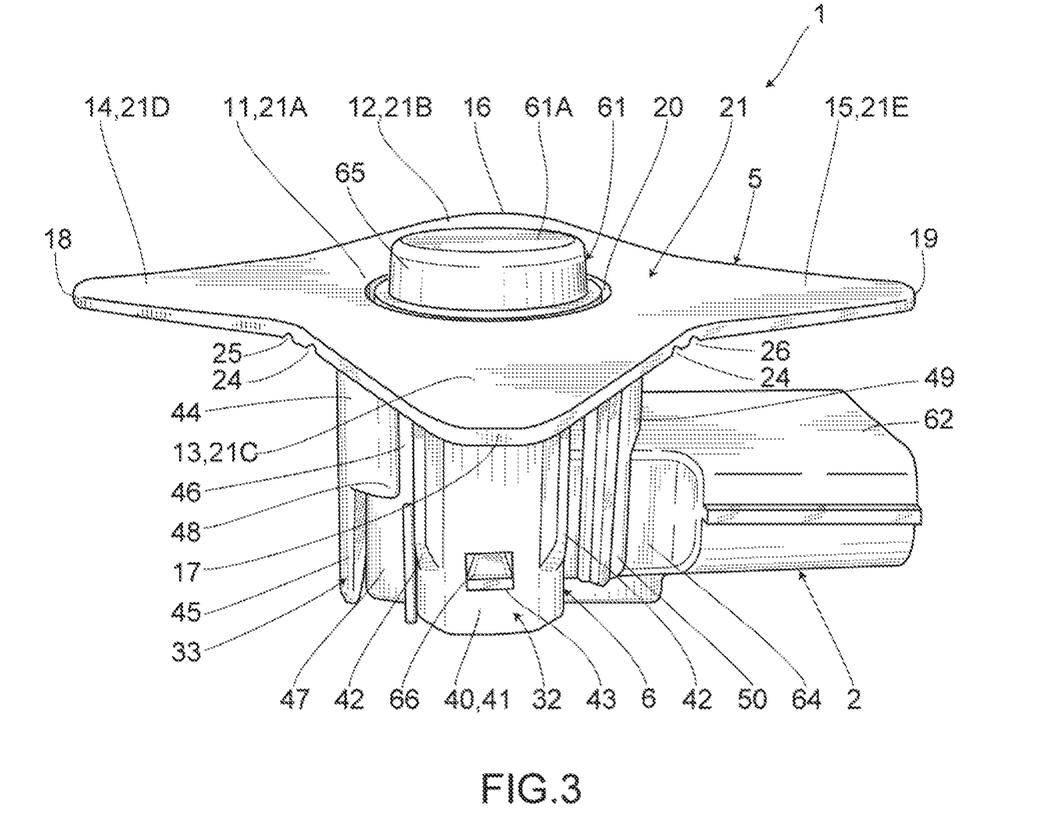
FIG. 3 is a lower perspective view showing the attachment component of the first embodiment of the invention, in which the vehicular member has already been installed in such attachment component.

In FIG. 1 and FIG. 2, "1" represents a retainer as an attachment component. This retainer 1 serves to hold an ultrasonic sensor 2 as a vehicular member, and is to be attached to a vehicle 3.

The retainer 1 has an attachment portion 5 that is to be attached to the inner surface of a bumper 4 of the vehicle 3; and a member holding portion 6 for holding the ultrasonic sensor 2. The retainer 1 is configured in a way such that the attachment portion 5 and the member holding portion 6 are integrally formed together through a synthetic resin.

The attachment portion 5 has a center attachment part 11 formed into the shape of a rectangular flat plate; and a flat plate-shaped upper attachment piece 12, lower attachment piece 13, left attachment piece 14 and right attachment piece 15 that protrude outward from the four sides of the center attachment part 11 in a manner such that they are provided as the extended sections of the center attachment part 11. The shapes of the upper attachment piece 12, the lower attachment piece 13, the left attachment piece 14 and the right attachment piece 15 are all identical to one another, each of which being substantially formed into the shape of a triangle tapering away from the center attachment part 11. As is the case for this embodiment, the bottom sections of the upper attachment piece 12, the lower attachment piece 13, the left attachment piece 14 and the right attachment piece 15 are provided on the four sides of the center attachment part 11, thereby achieving longer joining areas between the center attachment part 11; and the upper attachment piece 12, lower attachment piece 13, left attachment piece 14 and right attachment piece 15, thus improving joining strengths between the center attachment part 11; and the upper attachment piece 12, lower attachment piece 13, left attachment piece 14 and right attachment piece 15. Further, front end sections 16, 17, 18 and 19 as the front ends of the upper attachment piece 12, lower attachment piece 13, left attachment piece 14 and right attachment piece 15 are formed into curved shapes. Bored in the central area of the center attachment part 11 is a circular through hole 20 allowing a sensor microphone portion 61 of a later-described ultrasonic sensor 2 to be inserted therethrough. Here, the upper attachment piece 12, lower attachment piece 13, left attachment piece 14 and right attachment piece 15 may also be formed into other shapes such as semicircular shapes and rectangular shapes.

As shown in FIG. 3 to FIG. 6, since the attachment portion 5 is formed into the shape of a thin flat plate, it has an attachment surface 21 as a surface to be attached to the inner surface of the bumper 4; and a rear surface 22 as a surface opposite to such attachment surface 21. Cuttable sections 23, 24, 25 and 26 as thin-walled linear grooves are formed on the rear surface 22, specifically in the joining areas between the center attachment part 11; and the upper attachment piece 12, lower attachment piece 13, left attachment piece 14 and right attachment piece 15. Thus, the center attachment part 11; and the attachment pieces 12, 13, 14 and 15 are integrally formed together through the cuttable sections 23, 24, 25 and 26. In this embodiment, although the cuttable sections 23, 24, 25 and 26 are formed on the rear surface 22, they may by formed on the attachment surface 21, or on both the attachment surface 21 and the rear surface 22. Here, the cuttable sections 23, 24, 25 and 26 may also be formed into, for example, curved shapes, as long as they are cuttable.

The attachment surface 21 of the attachment portion 5 is composed of attachment surfaces 21A, 21B, 21C, 21D and 21E of the center attachment part 11, the upper attachment piece 12, the lower attachment piece 13, the left attachment piece 14 and the right attachment piece 15. Double-faced tapes 27A, 27B, 27C, 27D and 27E having areas identical to those of the attachment surfaces 21A, 21B, 21C, 21D and 21E, are attached to these attachment surfaces 21A, 21B, 21C, 21D and 21E. Since the double-faced tapes 27A, 27B, 27C, 27D and 27E are not attached to the through hole 20; and the cuttable sections 23, 24, 25 and 26, the double-faced tapes 27A, 27B, 27C, 27D and 27E are independent from one another. Here, the areas of the double-faced tapes 27A, 27B, 27C, 27D and 27E do not have to be identical to those of the attachment surfaces 21A, 21B, 21C, 21D and 21E, as long as such areas of the double-faced tapes are large enough to have an adhesiveness allowing the retainer 1 holding the ultrasonic sensor 2 to adhere and be reliably fixed to the bumper 4. In other words, the double-faced tapes 27A, 27B, 27C, 27D and 27E can have any areas/shapes under such condition. However, one or more pieces of each of the double-faced tapes 27A, 27B, 27C, 27D and 27E are attached to each of the attachment surfaces 21A, 21B, 21C, 21D and 21E.

The member holding portion 6 is erected from the center attachment part 11 of the rear surface 22 of the attachment portion 5, and is composed of an upper holding portion 31, a lower holding portion 32, a left holding portion 33 and a right holding portion 34. The upper holding portion 31 is configured as follows. That is, a rib 38 is provided in two end regions of an outer surface 37 of a main body plate portion 36 in a longer direction. The main body plate portion 36 is formed into the shape of a substantially rectangular plate, and the ribs 38 shorter than the main body plate portion 36 are erected from the center attachment part 11. Further, an engagement receiving portion (not shown) for engaging an engagement portion (not shown) of the later-described ultrasonic sensor 2, is provided on a rear end side of the main body plate portion 36 where the ribs 38 are not formed. This engagement receiving portion is an end portion of a substantially rectangular hole bored through the main body plate portion 36.

Figure 5:
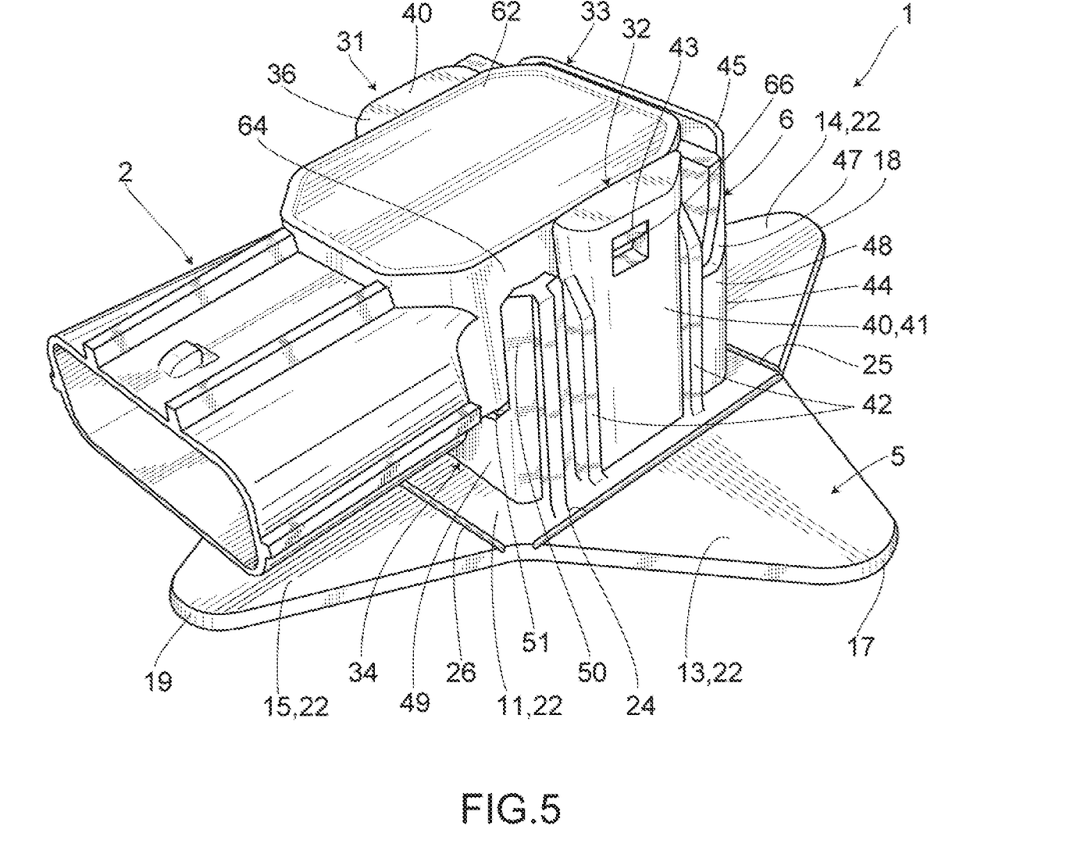
FIG. 5 is a right-lower perspective view showing the attachment component of the first embodiment of the invention, in which the vehicular member has already been installed in such attachment component.
Figure 6:
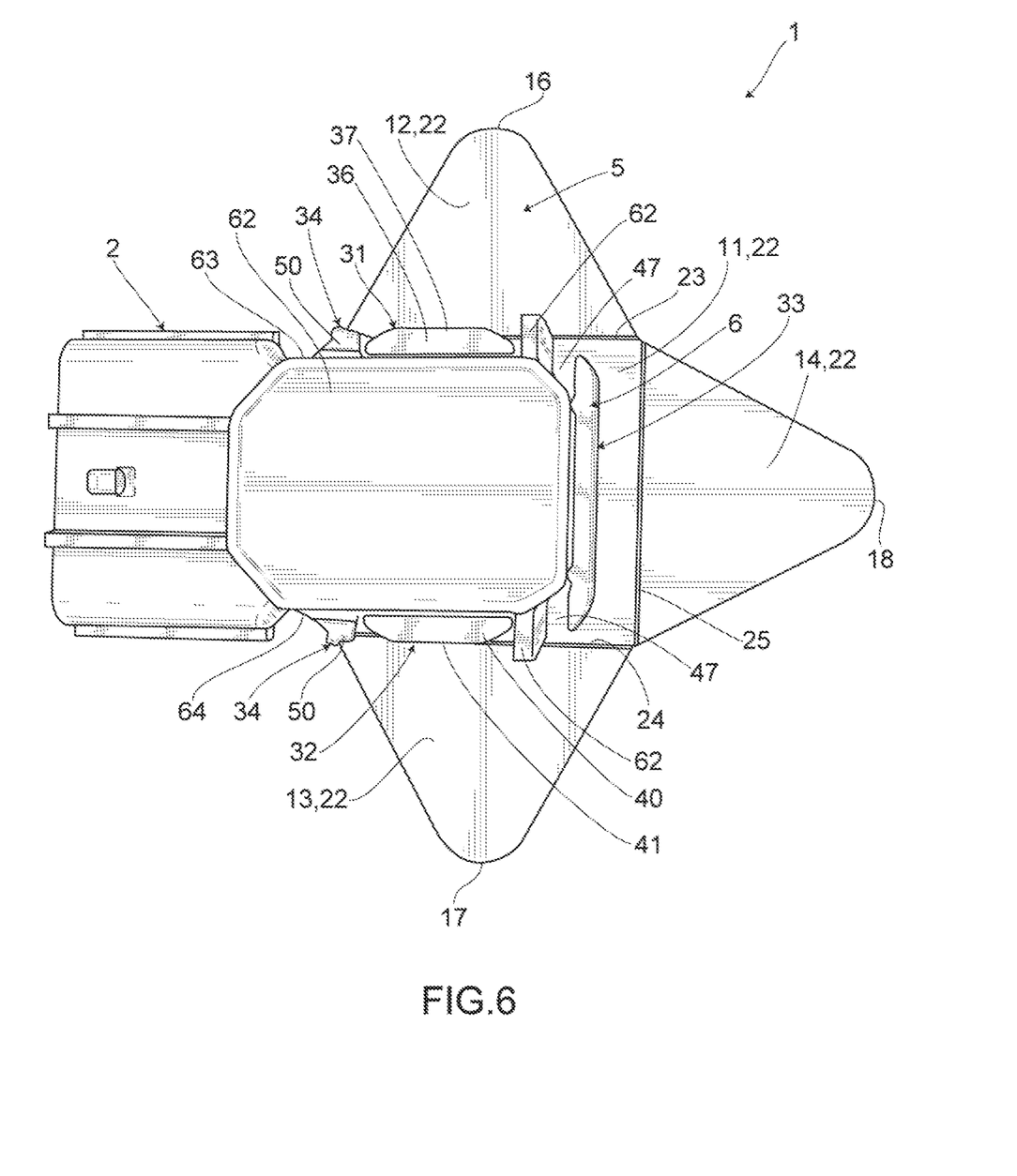
FIG. 6 is a rear perspective view showing the attachment component of the first embodiment of the invention, in which the vehicular member has already been installed in such attachment component.

As shown in FIG. 5, for example, the lower holding portion 32 has a configuration identical to that of the upper holding portion 31. That is, a rib 42 is provided in two end regions of an outer surface 41 of a main body plate portion 40 in a longer direction. The main body plate portion 40 is formed into the shape of a substantially rectangular plate, and the ribs 42 shorter than the main body plate portion 40 are erected from the center attachment part 11. Further, an engagement receiving portion 43 for engaging an engagement portion 66 of the later-described ultrasonic sensor 2, is provided on a rear end side of the main body plate portion 40 where the ribs 42 are not formed. This engagement receiving portion 43 is an end portion of a substantially rectangular hole bored through the main body plate portion 40.

Figure 4:
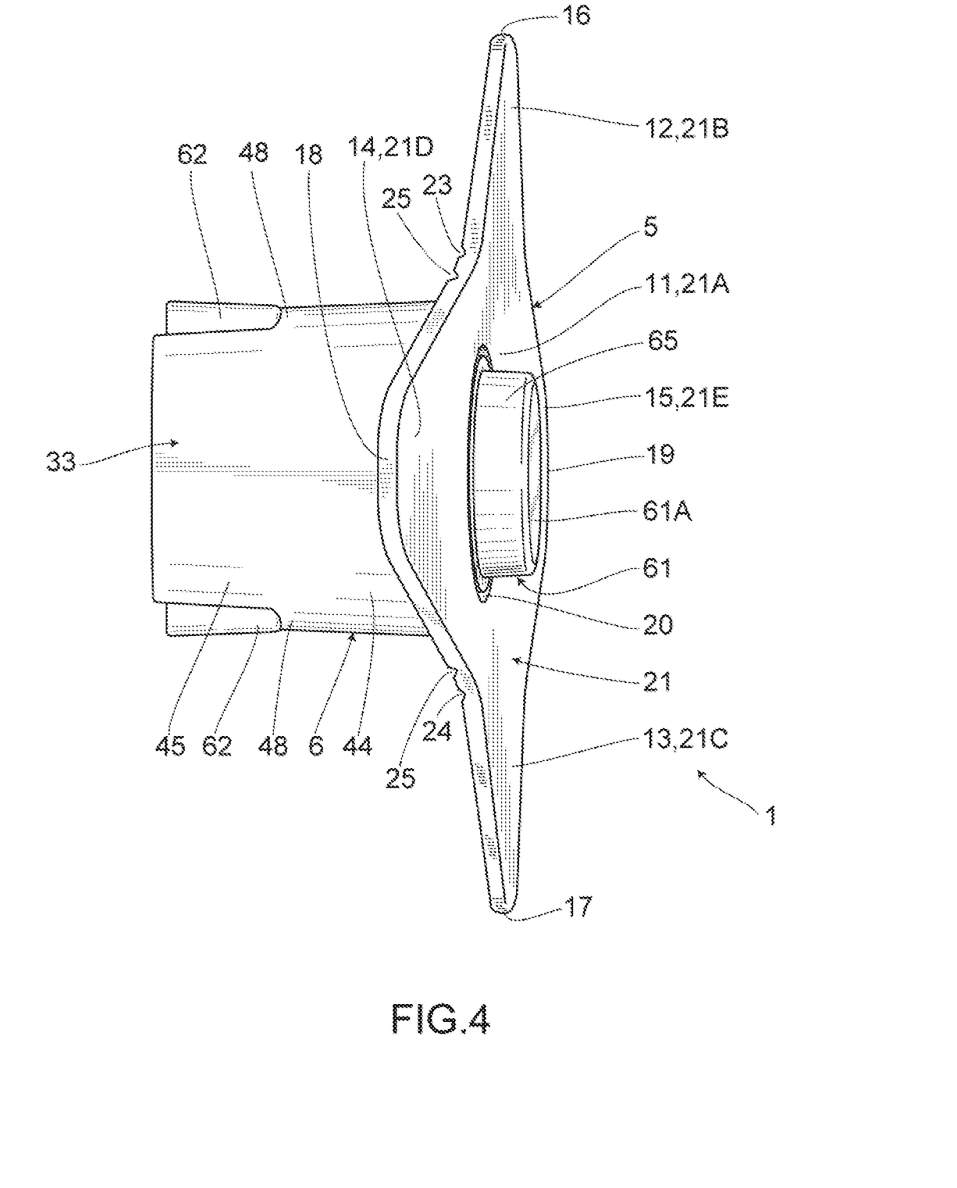
FIG. 4 is a left perspective view showing the attachment component of the first embodiment of the invention, in which the vehicular member has already been installed in such attachment component.

As shown in FIG. 4, for example, the left holding portion 33 is configured as follows. That is, the left holding portion 33 is erected from the rear surface 22. Further, the left holding portion 33 has a wide part 44 whose two ends are curved toward the upper holding portion 31 and the lower holding portion 32; and a narrow part 45 having a width narrower than that of the wide part 44. A thin clearance 46 is provided between the wide part 44 and the upper holding portion 31; and between the wide part 44 and the lower holding portion 32. The narrow part 45 is formed into the shape of a rectangular plate, and is located on the rear side of the wide part 44. A clearance 47 wider than the clearance 46 is provided between the narrow part 45 and the upper holding portion 31; and between the narrow part 45 and the lower holding portion 32. A curved part 48 composing the two ends of the wide part 44 allows the ultrasonic sensor 2 to abut thereagainst when the ultrasonic sensor 2 has been installed in the retainer 1. Therefore, the curved part 48 has a function of determining the direction from which the ultrasonic sensor 2 is to be inserted.

As shown in FIG. 1, for example, the right holding portion 34 has a base part 49 substantially formed into the shape of a rectangular plate; and an arm part 50 that is provided on both ends of the base part 49 and is formed longer than the base part 49 in a rear direction. In this way, a concave cutout section 51 is established between the base part 49 and the arm parts 50. The ultrasonic sensor 2 is to be arranged in such cutout section 51, and will thus abut against the base part 49. Thus, the curved part 48 of the left holding portion 33 and the base part 49 of the right holding portion 34 are capable of determining the direction from which the ultrasonic sensor 2 is to be inserted when installing the ultrasonic sensor 2 in the retainer 1. Further, since the ultrasonic sensor 2 is to be disposed between the arm parts 50, the ultrasonic sensor 2 can be restricted from moving in the vertical direction.

The ultrasonic sensor 2 has, for example, a cylindrical sensor microphone portion 61 and a sensor main body 62. The ultrasonic sensor 2 serves to emit an ultrasonic wave toward a target object through a wave transmitter (not shown), and then receive a reflected wave thereof through a wave receiver (not shown), thereby making it possible to detect the existence or non-existence of the target object or a distance to such target object. The wave transmitter and wave receiver are disposed inside the sensor main body 62. An ultrasonic wave is emitted from the sensor microphone portion 61 toward the outside, and a reflected wave thereof is then received by the inner side of the ultrasonic sensor 2 through the sensor microphone portion 61. The sensor microphone portion 61 is covered by an outer shell body 65 made of a synthetic resin such as a silicon rubber, except for a front surface 61A thereof. The outer shell body 65 is flexible, and is arranged between the bumper 4 and the sensor microphone portion 61.

The aforementioned engagement portion having a protruding shape is formed on an upper side surface portion 63 of the sensor main body 62. As a result of installing the ultrasonic sensor 2 in the retainer 1, this engagement portion will have engaged with the aforementioned engagement receiving portion of the retainer 1. Similarly, the engagement portion 66 having a protruding shape is formed on a lower side surface portion 64 of the sensor main body 62. As a result of installing the ultrasonic sensor 2 in the retainer 1, the engagement portion 66 will have engaged with the engagement receiving portion 43 of the retainer 1. Thus, the ultrasonic sensor 2 is able to be held by the retainer 1.

Next, a method for using the retainer 1 is described. In the beginning, a sensor insertion hole(s) 7 is/are to be bored in the bumper 4, the sensor insertion hole(s) 7 allowing the sensor microphone portion 61 of the ultrasonic sensor 2 to be inserted therethrough. Further, the sensor microphone portion 61 of the ultrasonic sensor 2 is to be inserted through the through hole 20 of the retainer 1 so as to install the ultrasonic sensor 2 in the retainer 1 in advance. When spaces for attaching the upper attachment piece 12, lower attachment piece 13, left attachment piece 14 and right attachment piece 15 can be secured around the sensor insertion hole 7 on the inner surface of the bumper 4, release papers 28A, 28B, 28C, 28D and 28E are to be peeled from the double-faced tapes 27A, 27B, 27C, 27D and 27E, followed by inserting the sensor microphone portion 61 through the sensor insertion hole 7, and attaching the attachment portion 5 to the inner surface of the bumper 4 through the double-faced tapes 27A, 27B, 27C, 27D and 27E, thereby allowing the retainer 1 and the ultrasonic sensor 2 to be attached to the bumper 4.

However, if there cannot be secured a space for attaching any of the upper attachment piece 12, lower attachment piece 13, left attachment piece 14 and right attachment piece 15 around the sensor insertion hole 7 on the inner surface of the bumper 4 e.g. if there cannot be secured a space for attaching the right attachment piece 15, the right attachment piece 15 will have to be bent about the cuttable section 26 so as to cut the cuttable section 26 and thus separate the right attachment piece 15 therefrom. Later, the release papers 28A, 28B, 28C and 28D are to be peeled from the double-faced tapes 27A, 27B, 27C and 27D, followed by inserting the sensor microphone portion 61 through the sensor insertion hole 7, and attaching the attachment portion 5 to the inner surface of the bumper 4 through the double-faced tapes 27A, 27B, 27C and 27D, thereby allowing the retainer 1 and the ultrasonic sensor 2 to be attached to the bumper 4. The right attachment piece 15 removed can simply be discarded, since it will not be used any more.

With regard to the upper attachment piece 12, lower attachment piece 13, left attachment piece 14 and right attachment piece 15, two of them such as the upper attachment piece 12 and the left attachment piece 14 may, for example, be removed by cutting the cuttable sections 23 and 25. Particularly, it is preferred that not more than two spots be cut in view of the adhesive strengths of the double-faced tapes 27A, 27B, 27C, 27D and 27E. However, when, for example, cutting the cuttable sections 23, 24 and 25 so as to remove three members which are the upper attachment piece 12, the lower attachment piece 13 and the left attachment piece 14, there may simply be employed double-faced tapes 27A, 27B, 27C, 27D and 27E with high adhesive strengths. That is, the retainer 1 is highly versatile, and can be applied to various types of vehicles by removing any of the upper attachment piece 12, lower attachment piece 13, left attachment piece 14 and right attachment piece 15.

In view of the design of the whole vehicle 3 including the ultrasonic sensor 2, in order for the ultrasonic sensor 2 to appropriately exhibit its sensing performance, and in order to make it difficult for the surrounding obstacles or the like to collide with the ultrasonic sensor 2, it is desired that the front surface 61A of the sensor microphone portion 61 and an outer surface 4A of the bumper 4 be made flush with each other, or that the sensor microphone portion 61 protrude from the outer surface 4A of the bumper 4 by an amount of not larger than 0.4 mm, with the retainer 1 and the ultrasonic sensor 2 being attached to the bumper 4. In this embodiment, the retainer 1 is configured in a way such that the sensor microphone portion 61 protrudes from the attachment surface 21 of the retainer 1 by 4.2 mm, with the ultrasonic sensor 2 being installed in the retainer 1. Further, although a thickness X of the bumper 4 may vary according to the type of the vehicle 3, it is normally assumed that such thickness X is in a range of 1.4 mm to 3.4 mm. Thus, when X is in a range of 3.4 mm≥X>3.0 mm, there are used double-faced tapes 27A, 27B, 27C, 27D and 27E having a thickness of 0.4 mm; when X is in a range of 3.0 mm≥X>2.6 mm, there are used double-faced tapes 27A, 27B, 27C, 27D and 27E having a thickness of 0.8 mm; when X is in a range of 2.6 mm≥X>2.2 mm, there are used double-faced tapes 27A, 27B, 27C, 27D and 27E having a thickness of 1.2 mm; when X is in a range of 2.2 mm≥X>1.8 mm, there are used double-faced tapes 27A, 27B, 27C, 27D and 27E having a thickness of 1.6 mm; and when X is in a range of 1.8 mm≥X>1.4 mm, there are used double-faced tapes 27A, 27B, 27C, 27D and 27E having a thickness of 2.0 mm. In this way, the sensor microphone portion 61 will be regulated to the extent that it will protrude from the outer surface 4A of the bumper 4 by an amount of 0 mm to 0.4 mm.

As described above, the retainer 1 of the present embodiment for installing the ultrasonic sensor 2 in the vehicle 3, has the member holding portion 6 for holding the ultrasonic sensor 2; and the attachment portion 5 that is to be attached to the vehicle 3. The attachment portion 5 has the center attachment part 11; the plurality of the attachment pieces which are the upper attachment piece 12, lower attachment piece 13, left attachment piece 14 and right attachment piece 15; and the cuttable sections joining the center attachment part 11 and the multiple attachment pieces 12, 13, 14 and 15. These upper attachment piece 12, lower attachment piece 13, left attachment piece 14 and right attachment piece 15 can be removed by cutting the cuttable sections 23, 24, 25 and 26. Thus, even when the retainer 1 cannot be attached to the bumper 4 as the upper attachment piece 12, lower attachment piece 13, left attachment piece 14 and right attachment piece 15 come into contact with the surrounding areas of where the retainer 1 is to be attached, such contact can be avoided by removing the interfering upper attachment piece 12, lower attachment piece 13, left attachment piece 14 and right attachment piece 15, thereby allowing the retainer 1 to be attached to the bumper 4.

Further, the center attachment part 11 is formed into a rectangular shape; and the upper attachment piece 12, lower attachment piece 13, left attachment piece 14 and right attachment piece 15 are respectively provided on the four sides of the center attachment part 11. Therefore, the upper attachment piece 12, lower attachment piece 13, left attachment piece 14 and right attachment piece 15 can be provided in a well-balanced manner in four directions at an interval of 90°.

Furthermore, since the upper attachment piece 12, lower attachment piece 13, left attachment piece 14 and right attachment piece 15 are formed into the shapes of flat plates, they can be easily cut off and removed. In addition, since the flat plate-shaped upper attachment piece 12, lower attachment piece 13, left attachment piece 14 and right attachment piece 15 are formed thin, it is unlikely that they will come into contact with the engine room or the like of the vehicle 3 when attaching the retainer 1 to the bumper 4.

Furthermore, since the cuttable sections 23, 24, 25 and 26 are formed as thin-walled linear grooves that are thinner than the upper attachment piece 12, lower attachment piece 13, left attachment piece 14 and right attachment piece 15, the cuttable sections 23, 24, 25 and 26 can be cut easily, and the upper attachment piece 12, lower attachment piece 13, left attachment piece 14 and right attachment piece 15 can be removed easily as well. Here, the cuttable sections 23, 24, 25 and 26 can be cut in a linear manner.

Second Embodiment

Figure 7:
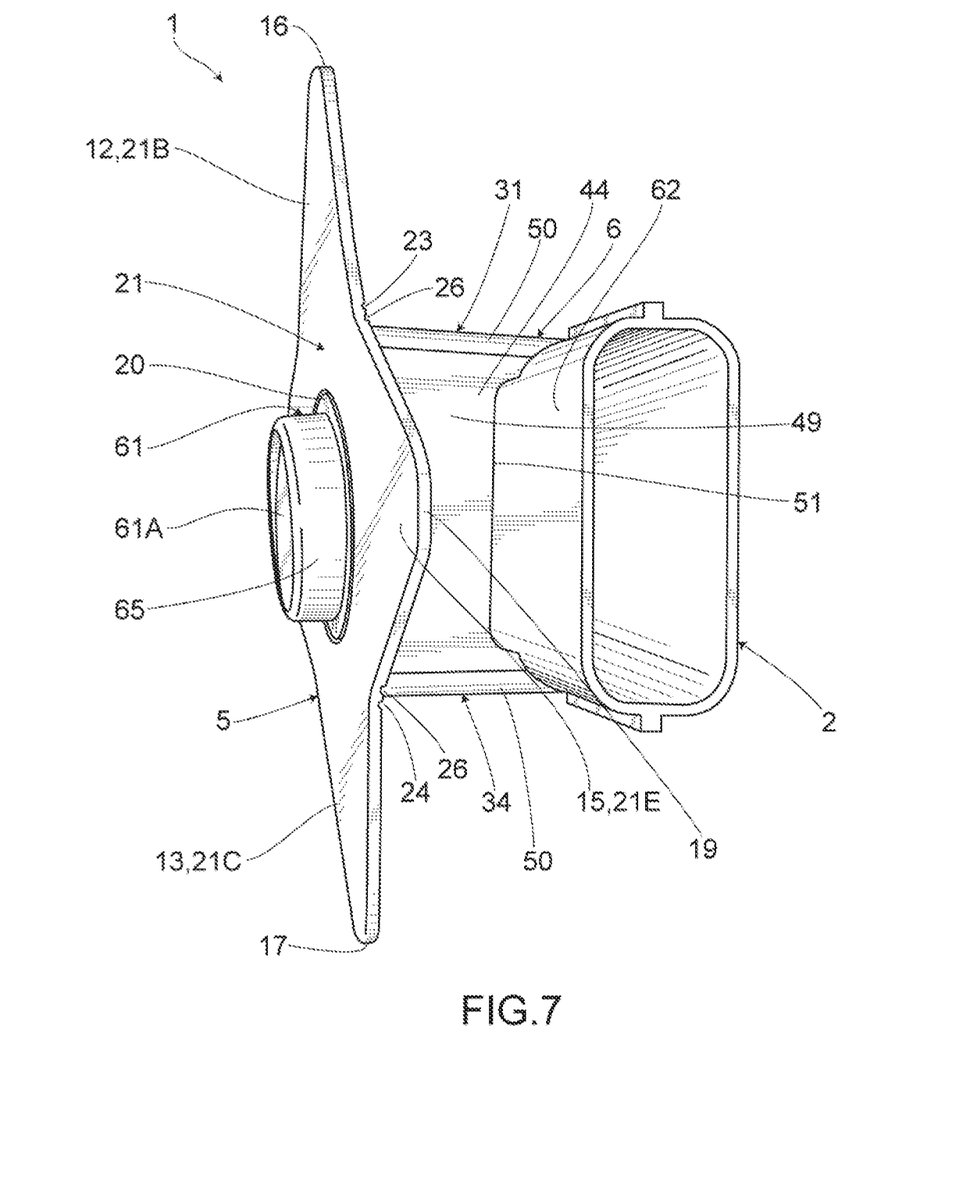
FIG. 7 is a right perspective view showing an attachment component of a second embodiment of the invention, in which the vehicular member has already been installed in such attachment component.

FIG. 7 shows a second embodiment of the present invention. Elements identical to those in the first embodiment are given identical symbols, and the descriptions thereof are thus omitted. In this embodiment, the attachment portion 5 is slanted in a way such that the attachment surface 21 of the attachment portion 5 will face downward by 4° with respect to the front surface 61A of the ultrasonic sensor 2 after installing the ultrasonic sensor 2 in the retainer 1. The retainer 1 in this embodiment is for use on a bumper 4 whose outer surface 4A faces downward by 4°. Thus, the front surface 61A of the ultrasonic sensor 2 faces upward by 4° with respect to the horizontal direction i.e. the attachment surface of the bumper 4, with the retainer 1 and the ultrasonic sensor 2 being attached to the bumper 4.

In this embodiment, the upper holding portion 31 located on the upper side of the member holding portion 6 is formed longer than that of the first embodiment in a front-rear direction, and the lower holding portion 32 located on the lower side of the member holding portion 6 is formed shorter than that of the first embodiment in the front-rear direction. The left holding portion 33 and the right holding portion 34 are formed in a way such that their lengths in the front-rear direction gradually become longer upward.

The sensor insertion hole 7 is bored in a direction orthogonal to the outer surface 4A even when the bumper 4 faces downward by 4°. Therefore, the outer shell body 65 in the present embodiment is capable of covering the sensor microphone portion 61 facing downward by 4° as is the case with the attachment portion 5. Thus, the outer shell body 65 can be horizontally inserted through the sensor insertion hole 7, and then evenly abut against the inner surface of the sensor insertion hole 7.

Further, the attachment portion 5 may also be slanted in a left-right direction, instead of the front-rear direction as described above. Moreover, the angle at which the attachment portion 5 is slanted can be arbitrarily selected. In this way, the retainer 1 is formed in a manner such that the inclination angle of the attachment portion 5 is determined in view of, for example, the angle of the inner surface of the bumper 4 to which the retainer 1 is to be attached, and a detection range of the ultrasonic sensor 2, thereby making it possible to point the ultrasonic sensor 2 at any angle.

However, the present invention is not limited to the abovementioned embodiments. In fact, various modified embodiments are possible within the scope of the gist of the present invention. For example, the center attachment part 11 may be formed into a polygon other than a tetragon, such as a pentagon or a hexagon; and the attachment piece may be provided on each side of these polygons.

What is claimed is:

1. An attachment component for attaching a vehicular member to a vehicle, comprising:
   a member holding portion for holding the vehicular member; and
   an attachment portion to be attached to the vehicle,
   wherein said attachment portion includes a center attachment part, a plurality of attachment pieces, and cuttable sections joining said center attachment part and the plurality of said attachment pieces,
   wherein each of said attachment pieces is formed into a shape of a triangle tapering away from said center attachment part,
   wherein said cuttable sections are thin-walled linear grooves that are thinner than said attachment pieces, and
   wherein said attachment pieces can be removed by cutting said cuttable sections.

2. The attachment component according to claim 1, wherein said center attachment part is formed into a rectangular shape, and said attachment pieces are provided on four sides of said center attachment part.

3. The attachment component according to claim 1, wherein each of said attachment pieces is a flat plate.

4. The attachment component according to claim 2, wherein each of said attachment pieces is a flat plate.

5. The attachment component according to claim 1, wherein said vehicular member is an ultrasonic sensor.

6. The attachment component according to claim 2, wherein said vehicular member is an ultrasonic sensor.

7. The attachment component according to claim 3, wherein said vehicular member is an ultrasonic sensor.

8. The attachment component according to claim 4, wherein said vehicular member is an ultrasonic sensor.

9. An attachment component for attaching a vehicular member to a vehicle, comprising:
   a member holding portion for holding the vehicular member; and
   an attachment portion to be attached to the vehicle,
   wherein said attachment portion includes a center attachment part, a plurality of attachment pieces, and cuttable sections joining said center attachment part and the plurality of said attachment pieces,
   wherein said center attachment part is formed into a rectangular shape, and said attachment pieces are provided on four sides of said center attachment part,
   wherein said cuttable sections are thin-walled linear grooves that are thinner than said attachment pieces, and
   wherein said attachment pieces can be removed by cutting said cuttable sections.

10. An attachment component for attaching a vehicular member to a vehicle, comprising:
    a member holding portion for holding the vehicular member; and
    an attachment portion to be attached to the vehicle,
    wherein said vehicular member is an ultrasonic sensor,
    wherein said attachment portion includes a center attachment part, a plurality of attachment pieces, and cuttable sections joining said center attachment part and the plurality of said attachment pieces,
    wherein said cuttable sections are thin-walled linear grooves that are thinner than said attachment pieces, and
    wherein said attachment pieces can be removed by cutting said cuttable sections.

* * * * *